US012801158B2

(12) United States Patent
Govindaswamy

(10) Patent No.: US 12,801,158 B2
(45) Date of Patent: Nov. 17, 2026

(54) COMPUTER ENABLED SYSTEM FOR OPTIMIZING TASK PERFORMANCE FOR ROBOTIC VEHICLES

(71) Applicant: Ganapathy Govindaswamy, Reston, VA (US)

(72) Inventor: Ganapathy Govindaswamy, Reston, VA (US)

( * ) Notice: Subject to any disclaimer, the term of this patent is extended or adjusted under 35 U.S.C. 154(b) by 0 days.

(21) Appl. No.: 18/966,020

(22) Filed: Dec. 2, 2024

(65) Prior Publication Data

US 2025/0181078 A1 Jun. 5, 2025

Related U.S. Application Data

(60) Provisional application No. 63/604,883, filed on Nov. 30, 2023.

(51) Int. Cl.
*G05D 1/648* (2024.01)
*G05D 1/644* (2024.01)
*G05D 107/70* (2024.01)

(52) U.S. Cl.
CPC ............. *G05D 1/648* (2024.01); *G05D 1/644* (2024.01); *G05D 2107/70* (2024.01)

(58) Field of Classification Search
CPC ..... G05D 1/648; G05D 1/644; G05D 2107/70
USPC ........................................................... 701/25
See application file for complete search history.

(56) References Cited

U.S. PATENT DOCUMENTS 12,399,500 B1 * 8/2025 Enright ................ G05D 1/0234
2021/0174209 A1 * 6/2021 Zhuang ................ G06N 3/0442
2022/0187847 A1 * 6/2022 Cella ................ G05B 19/41885
2024/0101350 A1 * 3/2024 Barbee ................. B65G 1/1373

* cited by examiner

*Primary Examiner* — Yazan A Soofi
(74) *Attorney, Agent, or Firm* — Donn K. Harms

(57) ABSTRACT

A computer-implemented system for maximizing warehouse operations is provided. Employing software operating to compare different combinations of robotic vehicles, human workers, and material handling equipment (MHE), the system determines an optimum combination of a number and type of robotic vehicle and any MHE changes to work in the most effective manner in combination with human workers. Virtual simulations of actual movements of the robotic vehicles, humans, and MHE changes in a warehouse may be employed on an ongoing basis the continually maximize efficiency.

8 Claims, 1 Drawing Sheet

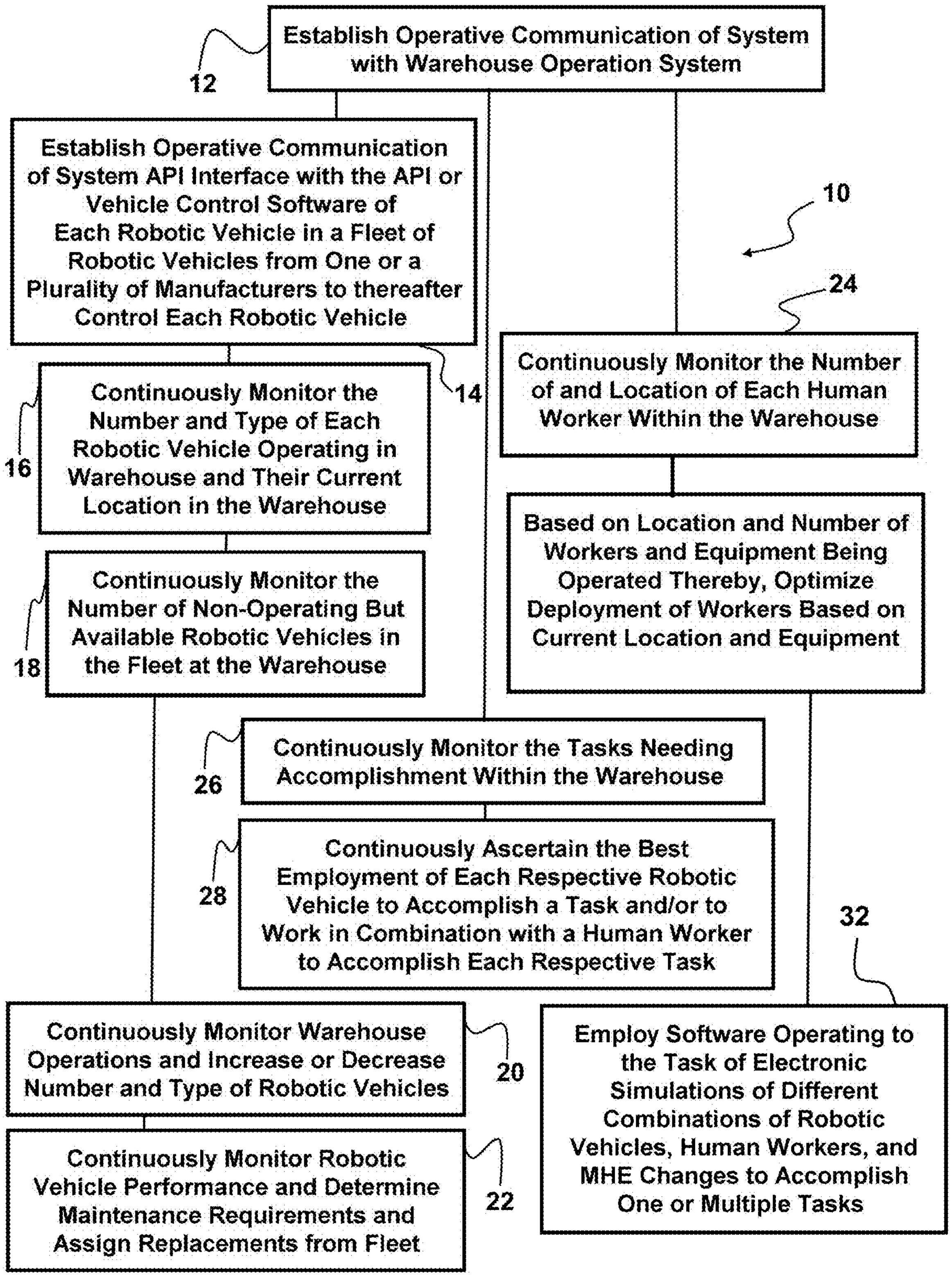
Establish Operative Communication of System with Warehouse Operation System
12
Establish Operative Communication of System API Interface with the API or Vehicle Control Software of Each Robotic Vehicle in a Fleet of Robotic Vehicles from One or a Plurality of Manufacturers to thereafter Control Each Robotic Vehicle
10
24
14
Continuously Monitor the Number and Type of Each Robotic Vehicle Operating in Warehouse and Their Current Location in the Warehouse
16
Continuously Monitor the Number of and Location of Each Human Worker Within the Warehouse
Based on Location and Number of Workers and Equipment Being Operated Thereby, Optimize Deployment of Workers Based on Current Location and Equipment
Continuously Monitor the Number of Non-Operating But Available Robotic Vehicles in the Fleet at the Warehouse
18
Continuously Monitor the Tasks Needing Accomplishment Within the Warehouse
26
Continuously Ascertain the Best Employment of Each Respective Robotic Vehicle to Accomplish a Task and/or to Work in Combination with a Human Worker to Accomplish Each Respective Task
28
32
Continuously Monitor Warehouse Operations and Increase or Decrease Number and Type of Robotic Vehicles
20
Employ Software Operating to the Task of Electronic Simulations of Different Combinations of Robotic Vehicles, Human Workers, and MHE Changes to Accomplish One or Multiple Tasks
Continuously Monitor Robotic Vehicle Performance and Determine Maintenance Requirements and Assign Replacements from Fleet
22

COMPUTER ENABLED SYSTEM FOR OPTIMIZING TASK PERFORMANCE FOR ROBOTIC VEHICLES

This application claims priority to U.S. Provisional Patent application 63/604,883 filed on Nov. 30, 2023.

BACKGROUND OF THE INVENTION

1. Field of the Invention

The invention herein disclosed relates generally to the field of automated warehouses employing robotic vehicles for product retrieval. More particularly, it relates to a system employing software running in electronic memory on a computer accessible over a network which operates to simulate performance in electronic memory by continuously assessing product retrieval requirements and performance for such by robotic vehicles from one or a plurality of manufacturers, to optimize the employed vehicles in the completion of assigned or determined tasks for product movement within a warehouse.

2. Prior Art

Background of the Invention

In previous decades warehoused products were moved around a distribution center using conveyors and forklifts and the like. In the modern era of huge warehouses and ultra fast product sales and shipping requirements, warehouses have become automated.

Where conventionally a human would determine a location in a warehouse or distribution center where a product is located and would then retrieve it, robotic vehicles are now widely employed alone or in combination with human workers for the performance of such tasks. Such robotic systems have significantly enhanced the efficiency of product retrieval and shipping in warehouse venues.

In modern robotic warehouse systems, products are positioned about the warehouse or distribution center in known locations, such as on shelves and in portable storage units. When an order for one or more products reaches the warehouse, the products contained in the order must be retrieved for shipping. Software running on computers operating to the task of determining product locations will actuate an automated vehicle or a robotic vehicle adapted to the task of retrieving the identified product or products to do so. In some instances, the robotic vehicles have onboard navigation wherein the floor space and aisles thereon are held in memory. Using this autonomous map, the activated robotic vehicle will determine a route to the requested product within the warehouse and move to retrieve it.

In some robotic retrieval systems, the mechanized vehicles and robotic vehicles of the system will navigate the route through the warehouse using a series of computerized location images located on the warehouse floor such as bar codes and other indicia identifying individual locations in the warehouse. Using software driven navigation based on ongoing input of scanned location images, the robotic vehicles or other mechanized retrieval vehicles will determine a route to each product and a return route to the position in the warehouse where products for each order are to be brought to assemble and ship the ordered products.

Modern robotic and mechanized retrieval vehicles have evolved to include sensors to prevent collisions between moving robotic vehicles and, more importantly, to prevent contact with humans within the warehouse. Using this automated navigation, when a robotic retrieval unit arrives at a determined product location, it will retrieve the product and thereafter map and follow a return route in a mapped warehouse to the location in the warehouse where an order requiring the retrieved product is being assembled.

However, while such robotic systems continue to evolve, currently, conventional robotic vehicles, depending on the manufacturer, work in a siloed environment where they are programmed to do only the specific functions for which they are designed and programmed. For example, pallet picking robots are adapted to work with palletized products. Case picking robots work with case lots and loose or unit picking robots are adapted for single product picking and transport.

Further, conventional robotic vehicles are configured to operate in the specific warehouse zones such as pallet storage locations, case picking locations or product bin locations. While such robotic vehicles, operating in this segmentized or siloed environment, provide the efficiencies for which they are designed, they may be unable to effectively communicate with each other due to differing manufacturers and differing software and communications capabilities. Consequently, they are currently limited to working on the tasks and in the limited zones for which they are designed and programmed. While such robotic systems have revolutionized the warehousing and product shipping industries, as can be discerned, where robotic vehicles from multiple manufacturers are employed at a single location, there can be significant problems in achieving the most efficient operation of the fleet of such differing robotic vehicles to retrieve products.

With respect to the above, before explaining at least one preferred embodiment of the software enabled system for optimizing the ongoing performance of individual tasks within a warehouse by fleets of robotic vehicles, it is to be understood that the robotic vehicle control and optimization system herein is not limited in its application to the details of employment and to the arrangement of the components or the steps set forth in the following description or illustrated in the drawings. The various software-enable methods and steps of the herein disclosed optimization of robotic vehicles invention is capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other other robotic vehicle optimization systems. It is important, therefore, that the embodiments, objects and claims herein, be regarded as including such equivalent construction and methodology insofar as they do not depart from the spirit and scope of the present invention.

SUMMARY OF THE INVENTION

The disclosed system herein provides for the real time and ongoing assessment of current operations of all robotic and mechanized operations of a warehouse or distribution center and a continuous optimization of such operations. The system herein operates as an intelligent software stack running in computer accessible memory on a computer or server or the cloud. To that end, the system employs software operating to the various individual tasks which allow the system to interface with and control and drive all robotic vehicle types in the warehouse along with other mechanized warehouse automation. The system accomplishes this hive efficiency of operation by knowing, discerning or forming an individual interface to communicate with each individual application programming interface (API) of each individual robotic vehicle as provided by vendors. In doing so, the system memorizes the performance abilities and characteristics of each individual robotic vehicle and thereafter orchestrates a hive or dynamic behavior of all such robotic vehicles as opposed to the "virtually siloed" operations individually thereof which are possible by the robotic vehicles of each individual robotic vendor.

In addition to forming an operational interface between the system and each individual API of each robotic vehicle, the system herein can also integrate and operate other material handling equipment (MHE) present in warehouse environments, such MHE components include but are not limited to conveyors, pick to light systems, smart cart systems, auto storage systems and other computer operated automated components of a conventional warehouse or distribution center.

Conventionally, each of the MHE vendors design their equipment for the distribution center where it will operate, and then deliver it and commission it to operate. In a similar fashion conventional robotic vehicle vendors design and map work spaces in which their respective fleet of robot vehicles will operate leaving operations to the buyer. With such a variance of operation of different robotic vehicles from different manufacturers with different API's the warehouse is designed and destined to deliver set defined efficiencies and a return on investment since nothing can be re-designated to operate differently should the promised or desired efficiencies be unachievable.

The system herein, employing software operating to accomplish the various software calculations or tasks, provides a platform which is adapted to look into different MHE automation, and different robotic vehicle types and deployment thereof over a time duration, and dynamically change the number and type of robotic vehicles, human workers and MHE adjustments for optimized workflows based on one or more optimization requirement criteria. Such optimization requirement criteria, for example, which will cause the system to change operations include, for example, order volumes arriving each day or each hour or each minute, current and future available human labor capacity, individual robot capacities by each robotic type and number of each available, MHE capacities, robotic vehicle fleet availability and other aspects which continually affect a mechanized warehouse operation.

Because the system operates by discerning or forming an interface between the system and each API of each robotic vehicle and the various MHE components, the system can easily be introduced and integrated into existing automated warehouse environments. Once the system has established API communication with each robotic vehicle from one or multiple manufacturers and with the MHE components, the warehouse operations can then continuously be optimized to maximize performance based on the noted optimization requirement criteria and the known available robotic vehicles, human workers, and MHE components being controlled. Such optimization as noted above includes the deployment of a number of and differing robotic vehicles, human workers and any MHE adjustments which are shown in simulations or other calculations to yield the best operation of the warehouse. For example the most throughput of products into and/or out of the warehouse as tasks accomplished by a simulated combination of robotic vehicles, human workers, and MHE changes or a time duration.

In planning for the optimization of warehouse operations, in addition to employing individual databases relating to the capabilities and known performance of each robotic vehicle employable in the individual warehouse, the system can also employ simulation tools. Software operating to run the warehouse in a virtual reality environment which emulates performance of robotic vehicles, human workers and MHE devices includes a map the individual warehouse and will simulate the warehouse operations being planned or calculated. In doing so the software will operate to simulate current and/or future operations, using the noted various known robotic vehicle performance characteristics and running a virtual rendition of multiple different combinations of robotic vehicles and humans operating virtually within the warehouse itself and any MHE changes.

For each such simulation, a simulation score card may be maintained to thereby employ software operating to the task of discerning the optimum choice for robotic vehicles and MHE components and humans for a current or upcoming time period within the warehouse. Using a scoring or scorecard system, a best or preferred combination of robotic vehicles, MHE components and human workers can be calculated or discerned from the simulated operations run in electronic memory to ascertain the best combination thereof, and initiating such.

Such simulations can also be performed before the significant capital investment decisions are made by the management for a new automation project whereby the optimum type and/or number of robotic vehicles and MHE components and/or upgrades can be determined before they are positioned on site.

In one preferred mode of the system herein, a preferred optimized score or number may be determined for each individual warehouse. This preferred optimized score can be determined at each warehouse using the electronic map thereof, the routes of robotic workers and human workers, the possible adjustments to MHE systems to the tasks of moving products. Such an optimized score, for example, may be the score which uses the least amount of time to accomplish a finite number of product movements within the warehouse, based on a combination of the number and type of robotic vehicles, and tasks or the number of human workers used in combination with the chosen robotic vehicles and MHE changes. Where used herein with regard to a warehouse, the term task which is accomplished by a robotic vehicle, a human, or an MHE component, means an individual movement of a product within the warehouse or into our out of the warehouse.

Once this optimized score for any warehouse operated by the system herein is derived, subsequent simulations for optimization yielding a simulation score at or closest to this optimized warehouse score can be chosen based on how close to this optimized score a calculated simulation score comes. This calculation using simulations of chosen robotic vehicles, humans, and MHE changes may take less time since a comparison of multiple simulation scores to the optimized score may be faster. Thereafter, the number and type of robotic vehicles, human workers, and any MHE changes determined in the simulation score which is closest to the optimized score may be actuated to perform the tasks in the warehouse.

Additionally, the optimized score for any warehouse may also take into consideration the least amount of electric energy required in areas where such is expensive, and/or the lowest number of human workers required to minimize labor costs.

In all modes of the warehouse and robotic vehicle performance optimization system and steps herein noted, the system provider will employ network accessible servers or computers having accessible electronic memory for storage and retrieval of electronic database information relating to each robotic vehicle type and their operational capabilities and abilities in an identified warehouse. Preferably, the warehouse itself will be mapped to allow all simulations to be run by software operating to that task, to achieve an accurate calculation of the performance abilities of each robotic vehicle within the mapped warehouse.

The software enabled system will continuously evaluate the retrieval requirements for each product in each order to be retrieved and the locations for each such product relative to each of the robotic vehicles in the fleet of robotic vehicles operating within the specific warehouse. Additionally included in a virtual simulation to optimize calculations can be order or product volumes arriving that day, hour, or minute, the human labor capacity available currently and in future time frames, and their locations relative to the available robotic vehicles, individual robot vehicle capabilities and capacities by each robotic type associated with a robotic identifier, the current MHE capacities to move products and orders and changes available to such capacities in future time frames, the individual robotic vehicles of the total robotic fleet available, the travel routes required for pickup and retrieval of products in the electronically mapped warehouse, the current and/or future robotic traffic running along such routes, and other aspects of warehouse operation which will lend to a simulation to ascertain the best combination of individual robotic vehicles, MHE capacity changes, and human workers, to accomplish the required tasks.

Because the system herein will achieve an operational interface with each API of each robotic vehicle enabling the system to operate such robotic vehicle, and with the operations software enabling real time control of MHE, using software operating to the task of running electronic simulations in electronic memory with varying robotic vehicles, MHE performance and human workers, an optimum combination of the number and type of robotic vehicles, MHE control changes, and human workers can be discerned.

By electronic simulations herein is meant, calculating the number of available robotic vehicles, the variable performance of each such robotic vehicle and its location in the warehouse, the current and future available human workers, and the adjustments that may be made to MHE controls, and using software operating with the electronically mapped warehouse to simulate movement and operation of any number and type and location of robotic vehicles, the available MHE adjustments, and the number and location of human workers within the warehouse, to ascertain the best combination robotic vehicles, MHE adjustments, and use of human workers to accomplish current tasks. The simulation score may be that of a time taken calculation for one or hundreds of current or future tasks whereby the simulation yielding the lowest amount of time in a calculated score may be enacted to thereby direct the robotic vehicles to operate in combination with MHE adjustments and human workers number and task assignment.

This same electronic simulation may be made to calculate future product movement requirements within the warehouse, and the type and number and capabilities of available robotic vehicles, the available MHE adjustments at the future time, and the number and skills of human workers that can be set to work in the warehouse at the future time frame, to calculate or ascertain the best combination of robotic vehicles, MHE changes, and human workers to accomplish the required product movement into and out of the warehouse.

In operating to make such a calculation by running electronic simulations of the mapped warehouse, the system may employ simulation electronic score cards. In this fashion, with each change in the simulation of type and number of robotic vehicles, available MHE changes, and human workers in any given simulation, a score card may be calculated. The scorecard calculation, for example and in no way limiting, may take into consideration the calculated amount of time available to move the desired amount of product within the warehouse, and a calculated duration of time it will take to move the product required for movement in the warehouse during a time frame allotted, using differing combinations of robotic vehicles, MHE changes, and human workers. The scorecard will change with each different simulation run with each mix of robotic vehicles, MHE changes, and human workers. An outcome may be the mix of robotic vehicles by type and number, MHE changes during the time frame, and humans set to work during the time frame, which yields the highest score on a scorecard.

Using the results of such ongoing virtual electronic simulations the system can then control any desired MHE changes, the number of human workers and tasks they are assigned and in combination therewith which robotic vehicles are actuated, and which robotic vehicles, so actuated, are employed for each retrieval or other needed task product moving task, its timing, its routing, and other factors to achieve maximized efficiency. Communications between the system and each robotic vehicle may be by any wireless communication mode which will operate effectively in the warehouse operation being controlled. Such communication, for example, may be by wireless RF communication or by light communication such as IR transceivers.

Whether a warehouse or distribution center employs robotic vehicles from one manufacturer or multiple manufacturers, software running in electronic memory will operate to perform each step or task, calculation or electronic simulation herein, based on the known retrieval abilities of each individual robotic vehicle, such as speed, onboard navigation, past performance for retrieving the identified product and other variables which may be correlated in a database related to each individual or type of robotic vehicle. Such an assessment by the system in a simulations, where robotic vehicles from multiple manufacturers having differing capabilities and different performance histories to ascertain the current best robotic vehicles to accomplish a retrieval task, is a primary function of the system and software enabled simulations of such herein.

The system herein employs a System Application Programming Interface (API) which has undergone an onboarding of each API for each robotic vehicle from each manufacturer. In this fashion, the system can employ an individual API interface to operatively control each of multiple robotic vehicles from multiple manufacturers. Using real time assessments of each available robotic vehicle, their type, their location, their abilities, and other known factors for each robotic vehicle, the system continuously calculates the best robotic vehicles and routes of movement to achieve the task, such as product retrieval for an order being assembled.

In operation to make such simulations and calculations based thereon, the system may first discern each individual robotic vehicle which is available for warehouse operations and associate it with a robotic identifier. Associated with each individual robotic vehicle with such a robot identifier will be a database listing of the physical and product movement capabilities of the robotic vehicle. In ongoing operations, because each individual robotic vehicle is identified, a tracking database can be associated with each individual robotic vehicle which tracks its speed, reliability, and other performance characteristics, as well as a duration of use to calculate when maintenance should be performed.

Where MHE components in the warehouse are to be controlled and optimized for performance in combination with the optimization of the robotic vehicles, each individual MHE component will be associated with an MHE identifier. Additionally, the controllable functions of each MHE component with an MHE identifier will be associated with it to allow the system to discern what functions it may control and how long such takes in time to optimize warehouse operations in combination with the control of the robotic vehicles.

Where human workers are included in the simulation of operations and outcome score, the locations of and capabilities and calculated amount of time it takes each worker to move the products required may be used in the score calculation. Changing the number human workers may also be considered.

As with the employment of electronic simulations of current and future operations noted above, for planning of warehouses, the system herein can also include virtual simulations in electronic memory of possible combinations of non operating but operable robotic vehicles which may be turned on to accomplish known tasks. The outcome of such ongoing virtual simulations will then be employed in the choosing and controlling of the actuation of robotic vehicles and/or the MHE components to achieve the desired level of optimization.

As to electronic memory or computer readable media for the system herein, any combination of one or more computer-usable or computer-readable media, be it transitory or non transitory, may be employed for operation of the software and the robotic vehicle assessment and assignment system herein. Such, for example and in no way limiting, can include computer-readable media and may include one or more of a portable computer diskette, a hard disk, a random access memory device, a read-only memory device, an erasable programmable read-only memory (EPROM or Flash memory) device, a portable compact disc read-only memory device, an optical storage device, and other electronic memory magnetic storage devices. Software or computer program code for carrying out the individual and sequential operations of product location assessment and product destination assessment and the most efficient routing therebetween for the determined optimum robotic vehicle for the task of the present invention may be written in any combination of one or more programming languages.

The steps or method of operation and/or execution of the various modes and tasks of the system herein may be illustrated as blocks or steps in the drawings which may represent one or more sequences in the operation of the steps and assessments in the system herein. These operations or steps can be implemented in hardware, software operating to process input data to accomplish the task or step, calculation, or a combination thereof.

With regard to software operating to a task or steps or assessments indicated in the warehouse operation optimization system herein, such represents computer-executable instructions stored upon one or more transitory or non-transitory computer-readable storage media which, when executed by one or a plurality of processors, will operate to perform the recited task, assessment, operation or step. Computer-executable instructions, in general, include routines, programs, algorithms, data structures, and the like which are configured to perform particular functions or to implement particular abstract data types or steps noted.

As examples of operation of the system, and in no manner to be considered limiting, the system can operate as follows:

Example 1: Two Case Picking Robots-One by Vendor a and the Other from Vendor B The system herein can recognize their respective positions, operations, the current task each is performing and then redirect each robotic vehicle in an optimum way based upon simulations of such performed in electronic memory, to perform in a congested area as opposed to operating in their "predefined" or "preprogramed" areas. For future operations Such redirection may be due to a variety of reasons, such as congestion in certain aisles in the zone of the warehouse where the robotic vehicles operate or a shortage of inventory of particular products. The system employing software operating to the task will preview booked orders communicated for fulfillment to the warehouse and then may use the same electronic software for simulating different combinations of robotic vehicles, MHE changes and human workers to calculate a manner to reduce robotic vehicles from being directed to pick products which will run out of inventory soon, and instead redirect them to another set of aisles or zones to pick other products which are needed.

Where certain aisles in the warehouse are damaged due to spillage or debris or other travel issues, the robotic vehicles can be communicated dynamically to be redirected to do other tasks upon other aisles until the damaged aisles are repaired.

This example shows that the system herein can remedy the problem caused by individual robotic vehicle vendors who configure their robots to do work only in specific areas of operation in the warehouse. Using the system herein, such robotic vehicles will be enabled to redirect dynamically to do work in the warehouse outside of their original areas of operation to increase overall warehouse operations by employing robotic vehicles to operate outside their original designed scope of operation.

Example 2: Replenishment

Conventionally, for replenishment, a robot type may be operating only on high reach aisles. In operation it will grab a pallet and bring it down to floor level for rapid picking (also called replenishments) by human pickers or picking robots. The robot manufacturer in most instances will have preprogramed a certain number of their robots for the high racking area of the warehouse. In such a case, a warehouse manager can never dynamically adjust these robots from their programmed replenishment tasks for other tasks based on a low volume day or a high volume day.

The system herein, based on the daily or hourly demand, can, on a "real-time" basis, perform thousands of simulations electronically to then balance and drive the amount of work and tasking to be given to the high reach robots and to other mobile transporting robots who come and pick the pallets or cases from the floor and take it away. This provides real-time optimization of a work load between the robots from different vendors who conventionally do not interrelate, and a "sensing" of which robot type, and how many of them can do replenishments and how many mobile transporter robots, which carry away the products ready to be picked from the floor locations, should be directed to these aisles where replenishment is being done Example 3: Sensing Congestion In the system herein, where each individual robotic vehicle is known and identified and each is tracked within the warehouse in real time for location, the proximity of robotic vehicles to human pickers can be continuously ascertained and the ongoing performance of each robotic vehicle can be altered in real time to work with the human picker.

In conventional operation, frequently, there may be a human picker working on a long aisle in a large warehouse and he/she is picking products. The human worker can frequently be waiting for a robotic vehicle to arrive so the human may pass a product along to the arriving robot to take it away for packing or to move it to the next zone for the next set of products to be picked.

Conventional robotic vehicles from individual different vendors are programmed to operate only with a set of robots from the same manufacturers who come to a predefined pickup point. Once there, the picker walks or travels 'x' yards to that drop off point. If the person is completing a pick and then has to do a stock taking (inventory count) and it takes an extra minute, the assigned robot vehicle must wait for that duration. In this case, the system herein using software operating to the task of simulating the operations can ascertain the calculated delay in advance or at the time it occurs and will dispatch another robotic vehicle to another person in better proximity and thereby divert the pick task and eliminates a substantial amount of wasted time.

The system herein, thus, continuously senses the real time proximity of robots and human resources and using software operating in electronic memory to the task, may perform ongoing electronic simulations in electronic memory to ascertain the best robotic vehicle from any manufacturer to be sent to the picker in terms of minimizing travel time. The simulation calculation for minimization, for example, may calculate the travel length and estimated time of each travel path, the geometry, and other contentions which are then computed by software adapted to the task, such as proprietary algorithms to provide this dynamic behavior where robotic vehicles from all manufacturers can be tracked and redirected.

It should be noted that the sequence in which the steps of the system herein are described or depicted are not intended to be construed as a limitation. It should be understood that any number of the described or designated steps can be combined in any order and/or in parallel to implement the described and depicted assessments and processes. In some modes of the warehouse optimization system herein, one or more steps can be rearranged or omitted entirely. Still further, the software-enabled steps in the system herein can be combined in whole or in part with each other or with other steps or methods and in running electronic simulations thereof.

With respect to the above description, before explaining at least one preferred embodiment of the system and method of controlling individual robotic vehicles and material handling equipment components, it is to be understood that the invention is not limited in its application to the details of operation nor the arrangement of the components or the steps set forth in the following description or illustrations in the drawings. The various methods of implementation and operation of the optimization system and method herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other methods and systems for optimizing robotic vehicle performance in a warehouse or distribution center environment and for carrying out the several purposes of the present method. Therefore, that the objects and claims herein should be regarded as including such equivalent construction, steps, and methodology insofar as they do not depart from the spirit and scope of the present invention.

It is a primary object of this invention to provide a computer-implemented system employing software operating to the tasks of operatively interfacing with the functional control (API) software of robotic vehicles from one or a plurality of manufacturers to continuously electronically task the individual robotic vehicles to optimize warehouse operations.

It is a further object of this invention to use this control and interfacing with multiple robotic vehicles from multiple vendors to remove the subjectivity of the choice of an individual robotic vehicle for a task the vendor programming indicates the robotic vehicle can do to continuously direct it for what the system determines over time that it actually can do.

It is another object of this invention to continuously monitor human worker tasks and human worker locations in a warehouse and the locations of robotic vehicles from multiple vendors and to maximize the help robotic vehicles from all manufacturers thereof can provide to the worker and warehouse operations in real time.

It is a further object of this invention to provide such a computer implemented system which continuously takes into consideration optimization criteria noted herein, in the continuous calculation of multiple ways to accomplish needed tasks in the warehouse and the optimum operation of each robotic vehicle and the fleet thereof in real time, to achieve maximum productivity within the warehouse operation.

It is a further object of this invention to the above noted computer implemented system which employs software operating to the task of running simulations of multiple different combinations of robotic vehicles, MHE adjustments, and human worker task assignments to discern the best combination of such from a score arrived using each combination in each simulation.

These, together with other objects and advantages which will become subsequently apparent, reside in the details of the construction and operation of the warehouse optimization system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURES

The accompanying drawings, which are incorporated herein and form a part of the specification, illustrate some but not the only or exclusive examples of embodiments and/or steps of the warehouse robotic vehicle optimization system herein. It is intended that the embodiments and FIGURES disclosed herein are to be considered illustrative of preferred modes of the system rather than limiting.

In the drawings:

FIG. 1 shows a simplified depiction of the system herein for optimizing the operations of a warehouse or distribution center.

DETAILED DESCRIPTION OF THE PREFERRED EMBODIMENTS OF THE INVENTION

Referring now to the method and system 10 herein as described above, a simplified depiction of the operation is shown in simple format in FIG. 1.

In all modes of the system 10, software operating to the task of establishing operative communication and functional control of warehouse operations is placed in operative communication with the overall warehouse operation system 12. As noted above, such may be by networked communication between the system herein and a remote warehouse operation or may be by operative installation in the computer system controlling such a fulfillment warehouse.

The system 10 in one mode thereof will determine a communication protocol and thereby establish operative electronic communication with the API or other software control interface for each robotic vehicle from each different manufacturer, which is employed in a warehouse 14. By operative electronic communication herein is meant that the system can control the actuation, deactivation, and movements of any given robotic vehicle or MHE component.

As noted above, such will frequently include a fleet of different robotic vehicles where the fleet has different robotic vehicles from different manufacturers. By establishing communication protocols and such operative communication 14 and using the known or determined operational abilities of each robotic vehicle, the system 10 herein can employ software operating to the task of calculating the most effective use of each robotic vehicle which may be accomplished using electronic simulation of multiple combinations of such robotic vehicles and/or MHE changes. The system 10 can also continuously monitor the number and type of robotic vehicles from the fleet currently operating in the warehouse 16.

Concurrently, the system 10 can continuously monitor the number and type of non-operating robotic vehicles in the fleet 18. In this fashion the system 10 can continuously monitor warehouse operations and work requirements at any given time and thereby increase or decrease the number and type of robotic vehicles from the fleet that are operating in the warehouse 20.

As noted above, using the manufacturer provided operational characteristics of each robotic vehicle from a database thereof, the system 10 and learned operational characteristics over time, the system 10 can also continuously monitor the actual mechanical operation of each robotic vehicle. Using this monitoring of robotic vehicle actual operation and the manufacturer provided characteristics for such, the system 10 can determine maintenance requirements 22 for each respective robotic vehicle and remove robotic vehicles for maintenance while concurrently activating replacement robotic vehicles for working in the warehouse. As noted above, it is the establishment of the operative interface and control of the multiple types of robotic vehicles, from multiple manufacturers by the system which enables such a performance and maintenance monitoring.

The system 10, as noted, will operate to maximize the ongoing operations of a warehouse, such as an order fulfillment warehouse in real time. To that end, using existing or provided beacons and locational determining devices within the warehouse, the system will monitor equipment, such as forklifts, pallet jacks and the like and their location and current tasks. The system will also continuously monitor the number of and the location of each human worker in the warehouse 24, and humans operating such equipment along with the location and type of each operating robotic vehicle to each human worker.

With the number of, type of and location of each robotic vehicle continuously known by the system 10 and the location of each human worker also being continuously known 24, the system 10 will continuously monitor the tasks or product movements needing accomplishment within the warehouse in real time 26. By monitoring the tasks 26, the system 10 employing software configured to run electronic simulations will continuously calculate different possible time frames to complete each such task using different types and/or combinations of robotic vehicles and the human workers, will continuously calculate and ascertain the best robotic vehicles to perform each respective task 28 or the best human based on location and equipment being operated and will optimize routes and how much the equipment and humans must travel to retrieve a product and to wait for a robot to arrive. It will then continuously optimize the deployment of human workers, the operation of MHE components or equipment and the number and type of robotic vehicles 30 to minimize the time spent to accomplish the task or group of tasks over a time duration. Such might include a meeting of the human worker and the robot at a designated point or initiating a wait period for a robot to come to which zone the person is currently performing work, or whether there is there a better robot-person pairing which can be accomplished for a better task management for the specific task needed.

Such a continuous assessment and optimization 30 may include for the total tasks being performed by one or more robotic vehicles or the tasks being performed with one or more system-directed robotic vehicles in combination with the work of a human worker, the best equipment or robotic vehicles for the task or tasks, the locations of all humans and robotic vehicles, any clogged pathways for both, and other factors.

Using the outcome of a number of different calculations for movement and operation of robotic vehicles alone or in combination with other robotic vehicles and/or humans, the system 10 in real time can determine the best robotic vehicle from the fleet to work on the task alone or in combination with other robotic vehicles and/or human workers. The system 10, over time, will "learn" the performance characteristics of each type of robotic vehicle and also be able to include such learned performance characteristics in the calculations for optimum use of robotic vehicles alone or in combination with human workers.

As noted, the system herein can accomplish this continual assessment using software operating to run electronic simulations 32 in memory. In this fashion, using an electronic map of the warehouse, simulations are run where a task or multiple tasks are accomplished in the simulation using different combinations of the robotic vehicles, human workers, and changes to MHE components, such as speeding up conveyers or slowing down auto pickers and the like. The electronic simulation software operates within electronic memory to run the warehouse in a virtual reality environment which emulates movement and performance of robotic vehicles, that of human workers and the operation MHE devices in accomplishing one or many tasks over a duration of time. The electronic map of the individual warehouse and will simulate the warehouse operations to accomplish tasks or those being planned. In doing so the software will operate run multiple different simulations using different numbers of and types of the known available robotic vehicle and their respective performance characteristics, in combination with humans operating virtually within the warehouse and multiple different MHE changes.

For each such simulation score may be calculated where each combination of robotic vehicles and humans and MHE changes results in the task or tasks being accomplished in a time duration. A best or preferred combination of robotic vehicles, MHE components and human workers can be calculated or discerned from the simulated operations run in electronic memory to ascertain the best combination thereof which had the lowest amount of time to accomplish the task or tasks. Based on the simulation with the best simulation score, the robotic vehicles, humans and any MHE changes from this simulation will be assigned to the warehouse to accomplish the task or tasks.

In a similar mode of the system herein which also uses electronic simulations, a preferred optimized score may be determined for each individual warehouse as a default goal. This preferred optimized score can be determined at each warehouse using the electronic map thereof and simulating the routes of robotic workers and human workers and the possible adjustments to MHE systems to the tasks of moving products. Such an optimized score, for example, may be the score which uses the least amount of time to accomplish an assigned number of product movements within the warehouse, based on a desired combination of the number and type of robotic vehicles and tasks or the number of human workers used in combination with the chosen robotic vehicles and MHE changes.

Thereafter, the system can run assessments using software operating to run electronic simulations 32, for a number of current or future tasks to be performed over a duration of time to determine a simulation score, for each combination employed in the simulation of type and number of robotic vehicles, number of human workers, and any MHE changes. The simulation score coming closest to the optimized score, previously determined, may cause the system to implement the number and type of robotic vehicles, the human workers and any MHE changes, used in that simulation to operate in the warehouse for the tasks.

While all of the fundamental characteristics and features of the system for optimization of performance of robotic vehicles and other material handling equipment in a warehouse environment have been shown and described herein, with reference to particular embodiments thereof, a latitude of modification, various changes and substitutions are intended in the foregoing disclosure and it will be apparent that in some instances, some features or steps of the disclosed system may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention herein disclosed.

What is claimed is:

1. A computer-implemented method for maximizing warehouse operations using different combinations of robotic vehicles and human workers, for accomplishing tasks in the warehouse, comprising:

a processor, and a non-transitory, computer readable medium communicably coupled to the processor and storing instructions that, when executed by the processor, cause the processor to perform operations comprising:

continuously calculating tasks to be performed in said warehouse;

calculating a combination of robotic vehicles and human workers to accomplish said tasks in a least amount of time;

actuating said robotic vehicles to perform said tasks in combination with said human workers.

2. The computer implemented method of claim 1, additionally comprising:

including operation of MHE components in said calculating of a combination of robotic vehicles and human workers to accomplish said tasks in a least amount of time; and actuating changes in said operation of said MHE components to perform said tasks in combination with said human workers in said least amount of time.

3. The computer-implemented method of claim 2, additionally comprising the steps of:

establishing operative electronic communication with each of said robotic vehicles;

establishing operative electronic communication with each said MHE component;

actuating said robotic vehicles by electronically signaling said robotic vehicles to work in combination with said human workers and said MHE components to accomplish said tasks; and actuating each said MHE component by electronically signaling said MHE component to work in combination with said human workers and said robotic vehicles to accomplish said tasks.

4. The computer-implemented method of claim 1, additionally comprising the steps of:

storing an electronic map of said warehouse;

running a plurality of electronic simulations using different operation combinations including different numbers and types of said robotic vehicles and different numbers of said human workers to virtually accomplish said tasks in a virtual time period by virtual movement employment of said chosen robotic vehicles and said human workers to perform said tasks, within said electronic map;

ascertaining a determined one of said plurality of electronic simulations having a smallest said virtual time period; and actuating said robotic vehicles, said human workers employed in said determined one of said plurality of electronic simulations to perform said tasks.

5. The computer-implemented method of claim 2, additionally comprising the steps of:

storing an electronic map of said warehouse;

running a plurality of electronic simulations using different operation combinations including different numbers and types of said robotic vehicles and different numbers of said human workers to virtually accomplish said tasks in a virtual time period by virtual movement employment of said chosen robotic vehicles and said human workers to perform said tasks, within said electronic map;

ascertaining a determined one of said plurality of electronic simulations having a smallest said virtual time period; and actuating said robotic vehicles, said human workers, and different said changes in said operation of said MHE components employed in said determined one of said plurality of electronic simulations to perform said tasks.

6. The computer-implemented method of claim 3, additionally comprising the steps of:

storing an electronic map of said warehouse;

running a plurality of electronic simulations using different operation combinations including different numbers and types of said robotic vehicles and different numbers of said human workers to virtually accomplish said tasks in a virtual time period by virtual movement employment of said chosen robotic vehicles and said human workers to perform said tasks, within said electronic map;

ascertaining a determined one of said plurality of electronic simulations having a smallest said virtual time period; and actuating said robotic vehicles, said human workers, and different said changes in said operation of said MHE components employed in said determined one of said plurality of electronic simulations to perform said tasks.

7. A computer-implemented method for maximizing warehouse operations using different combinations of robotic vehicles and human workers for accomplishing tasks in the warehouse, comprising:

a processor, and a non-transitory, computer readable medium communicably coupled to the processor and storing instructions that, when executed by the processor, cause the processor to perform operations comprising:

determining an optimized score of operation of a warehouse using an electronic map thereof and simulating routes of robotic workers and human workers performing a number of tasks in said electronic map within a determined period of time;

running a plurality of simulations of current operations of said warehouse where each simulation includes changes to a current number of robotic workers and a current number of human workers to discern a simulation score for each simulation; and changing said current number of robotic workers and said current number of human workers to that used in a said simulation having a simulation score closest to that of said optimized score.

8. The computer-implemented method of claim 7 additionally comprising:

including a preferred operation of MHE components in said calculation of said optimized score; and including a current MHE operation in said a plurality of simulations of current operations of said warehouse;

changing said current number of robotic workers and said current number of human workers and said current MHE operation, to that used in a said simulation having a simulation score closest to that of said optimized score.

* * * * *